United States Patent
Hamed et al.

(10) Patent No.: US 10,567,556 B2
(45) Date of Patent: Feb. 18, 2020

(54) COMMUNICATION CIRCUITRY IN AN ELECTRONIC CONTROL UNIT

(71) Applicant: Mentor Graphics Corporation, Wilsonville, OR (US)

(72) Inventors: Ahmed Hamed, Cairo (EG); Mona Safar, Cairo (EG); Ashraf Salem, Cairo (EG)

(73) Assignee: Mentor Graphics Corporation, Wilsonville, OR (US)

( * ) Notice: Subject to any disclaimer, the term of this patent is extended or adjusted under 35 U.S.C. 154(b) by 148 days.

(21) Appl. No.: 15/458,727

(22) Filed: Mar. 14, 2017

(65) Prior Publication Data

US 2017/0264718 A1    Sep. 14, 2017

Related U.S. Application Data

(60) Provisional application No. 62/307,731, filed on Mar. 14, 2016.

(51) Int. Cl.
*H04L 29/06* (2006.01)
*H04L 12/46* (2006.01)
*H04L 12/40* (2006.01)

(52) U.S. Cl.
CPC .......... *H04L 69/26* (2013.01); *H04L 12/4625* (2013.01); *H04L 69/22* (2013.01); *H04L 2012/40273* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,363,254 B1* | 3/2002 | Jones | .................... | G01S 5/0027 455/456.1 |
| 7,366,961 B1* | 4/2008 | Kovacevic | ........... | H04N 21/434 714/701 |
| 2014/0337650 A1* | 11/2014 | Madhusudana | ....... | G06F 1/3268 713/323 |

OTHER PUBLICATIONS

Chiricescu, S.; Chai, S.; Moat, K.; Lucas, B.; May, P.; Norm, J.; Essick, R.; Schuette, M., "RSVP II: A next generation automotive vector processor," Intelligent Vehicles Symposium, 2005. Proceedings. IEEE, pp. 563-568, Jun. 2005.
(Continued)

*Primary Examiner* — Ian N Moore
*Assistant Examiner* — Latresa A McCallum
(74) *Attorney, Agent, or Firm* — Mentor Graphics Corporation (57) ABSTRACT

This application discloses an electronic control unit coupled to a bus in a vehicle communication network. The electronic control unit includes a processing system configured to generate an instruction including an identifier of a type of signal exchanged through a vehicle communication network and including a command associated with exchange of a signal value corresponding to the type of the signal. The electronic control unit includes a communication circuitry configured to identify, based on the type of the signal in the instruction, a packet having a section allocated for the signal value corresponding to the type of the signal. The communication circuitry also can perform packet operations on the section of the packet allocated for the signal value based, at least in part, on the command included in the instruction. The packet operations can include packing the signal value into the packet or extracting the signal value from the packet.

17 Claims, 5 Drawing Sheets

(56) References Cited

OTHER PUBLICATIONS

C. V. Briciu, I. Filip and F. Heininger. "A new trend in automotive software: AUTOSAR concept." 8th IEEE International Symposium on Applied Computational Intelligence and Informatics (SACI), pp. 251-256, May 2013.

K. Chaaban, N. Rizoug, B. Barbedette and S. Saudrais. "Model-based development of an embedded steering-by-wire system." 8th International Symposium on Mechatronics and its Applications (ISMA), pp. 1-6, Apr. 2012.

Ruyi Wu, Hong Li, Min Yao, Jinbo Wang and Yuhao Yang. "A hierarchical modeling method for AUTOSAR software components." 2nd International Conference onComputer Engineering and Technology (ICCET), pp. V4-184-V4-188, Apr. 2010.

Daehyun Kum, G. M. Park, Seonghun Lee and Wooyoung Jung. "AUTOSAR migration from existing automotive software." International Conference on Control, Automation and Systems, pp. 558-562, Oct. 2008.

Y. Shoukry, A. Kumar, M. W. El-Kharashi, G. Bahig and S. Hammad, "Graph-based approach for software allocation in automotive networked embedded systems: A partition-and-map algorithm," Forum on Specification & Design Languages (FDL), pp. 1-6, Sep. 2013.

F. Gross, T. Steinbach, F. Korf, T. C. Schmidt and B. Schwarz, "A hardware/software co-design approach for Ethernet controllers to support time-triggered traffic in the upcoming IEEE TSN standards," 2014 IEEE Fourth International Conference on Consumer Electronics, pp. 9-13, Sep. 2014.

M. Ishikawa, D. J. McCune, G. Saikalis and S. Oho, "CPU Model-Based Hardware/Software Co-design, Co-simulation and Analysis Technology for Real-Time Embedded Control Systems," 13th IEEE Real Time and Embedded Technology and Applications Symposium, pp. 3-11, Apr. 2007.

Peng Li; Hua Tang, "Design of a Low-Power Coprocessor for Mid-Size Vocabulary Speech Recognition Systems," IEEE Transactions on Circuits and Systems I: Regular Papers, vol. 58, No. 5, pp. 961-970, May 2011.

Y. Shoukry, M. W. El-Kharashi, H. Shorkry, and S. Hammad, "An embedded hardware implementation of the GPC-on-Chip applied to automotive active suspension systems," 2011 Saudi International Electronics, Communications and Photonics Conference (SIECPC), pp. 1-6, Apr. 2011.

Shoukry, Y.; El-Kharashi, M.W.; Hammad, S., "MPC-On-Chip: An Embedded GPC Coprocessor for Automotive Active Suspension Systems," IEEE Embedded Systems Letters, vol. 2, No. 2, pp. 31-34, Jun. 2010.

Chiricescu, S.; Schuette, M.; Essick, R.; Lucas, B.; May, P.; Moat, K.; Norris, J., "RSVP: an automotive vector processor," 2004 IEEE Intelligent Vehicles Symposium, pp. 200-205, Jun. 14-17, 2004.

D. Patterson and J. Hennessy. "Computer Organization and Design—The Hardware/Software Interface." 5th Edition. Elsevier Science in Morgan Kaufmann series in computer architecture and design, pp. 277-284, Oct. 2013.

D. Patterson and J. Hennessy. "Computer Architecture—A Quantitative Approach." 5th Edition. Elsevier Science in Morgan Kaufmann series in computer architecture and design, p. 182, Sep. 2011.

J.P. Shen and M. H. Lipasti. "Modem Processor Design—Fundamentals of Superscalar Processors." Tata McGraw—Hill Publishing Company Limited, pp. 70-73, Jul. 2004.

* cited by examiner

| | | | |
|---|---|---|---|
| INSTRUCTION FETCH STAGE 701 | CYCLE #0 | FETCH INSTRUCTION FROM INSTRUCTION MEMORY | |
| | CYCLE #1 | GENERATE SIGNAL CHARACTERISTIC ADDRESS BASED ON INSTRUCTION | |
| INSTRUCTION DECODE STAGE 702 | CYCLE #2 | GENERATE PACKET ID ADDRESS BASED ON INSTRUCTION<br>STORE SIGNAL CHARACTERISTIC ADDRESS IN REGISTER | |
| | CYCLE #3 | SELECT SIGNAL CHARACTERISTIC ADDRESS FOR READ OPERATION<br>STORE PACKET ID ADDRESS IN REGISTER | |
| SIGNAL PROPERTIES FETCH STAGE 703 | CYCLE #4 | READ SIGNAL MEMORY AT SIGNAL CHARACTERISTIC ADDRESS<br>SELECT PACKET ID ADDRESS FOR READ OPERATION | |
| | CYCLE #5 | STORE SIGNAL CHARACTERISTICS READ FROM SIGNAL CHARACTERISTIC MEMORY<br>READ SIGNAL MEMORY AT PACKET ID ADDRESS | |
| PACKET FETCH STAGE 704 | CYCLE #6 | STORE PACKET ID READ FROM SIGNAL CHARACTERISTIC MEMORY<br>READ PACKET MEMORY WITH PACKET ID | |
| | CYCLE #7 | EXTRACT PORTION OF PACKET READ FROM PACKET MEMORY AT A POSITION IN THE PACKET DEFINED BY SIGNAL CHARACTERISTICS | |
| PACKET MANIPULATION STAGE 705 | CYCLE #8 | FOR SEND INSTRUCTION<br>ADD SIGNAL VALUE FROM INSTRUCTION TO EXTRACTED PORTION OF THE PACKET | FOR RECEIVE INSTRUCTION<br>REMOVE SIGNAL VALUE FROM EXTRACTED PORTION OF THE PACKET |
| | CYCLE #9 | INSERT EXTRACTED PORTION WITH ADDED SIGNAL VALUE INTO PACKET | - |
| OUTPUT STAGE 706 | CYCLE #10 | STORE PACKET IN OUTPUT BUFFER AND IN PACKET MEMORY | STORE SIGNAL VALUE IN OUTPUT BUFFER |
| | CYCLE #11 | DELIVER CONTENTS OF OUTPUT BUFFER TO PROCESSING SYSTEM OF ELECTRONIC CONTROL UNIT | |

FIG. 7

COMMUNICATION CIRCUITRY IN AN ELECTRONIC CONTROL UNIT

RELATED APPLICATION

This application claims priority to U.S. Provisional Patent Application Ser. No. 62/307,731, filed Mar. 14, 2016, which is incorporated by reference herein.

TECHNICAL FIELD

This application is generally related to vehicle communication networks and, more specifically, to dedicated communication circuitry in an electronic control unit.

BACKGROUND

Modern vehicles include electronics to control functionality ranging from operation and movement of the vehicles, to passenger convenience features, such as lights, power door locks, powers windows, power seats, or the like. These electronics can include embedded systems, for example, implement by electronic control units (ECUs), configured or programmed to perform dedicated functions within the vehicles.

The electronic control units, in some examples, can implement a standardized AUTOSAR (AUTomotive Open System ARchitecture) layered software architecture, for example, having an application layer, a runtime environment (RTE) layer, and a basic software (BSW) layer. An electronic control unit can communicate with other electronic control units in the vehicle utilizing at least one software module in the basic software (BSW) layer, such as an AUTOSAR communication (COM) module. For example, a vehicle can include a wiring harness having at least one communication bus to allow electronic control units to exchange of data packets or frames, called interaction protocol data units (I-PDUs) in the AUTOSAR standard, utilizing a controller area network (CAN) protocol, a local interconnect network (LIN) protocol, a FlexRay protocol, or the like. The AUTOSAR communication module implemented by a general-purpose processor in the electronic control unit can perform the transmission and reception operations for the electronic control unit.

The interaction protocol data units exchanged between electronic control units over a communication bus can be packed with multiple different pieces of information related to the vehicle, each piece of information can be called a signal value. For example, sensors in a vehicle can detect various conditions of the vehicle, such as vehicle speed, tire pressure, temperature, or the like, which can be provided to a corresponding electronic control unit. The electronic control unit, for example, via implementation of the runtime environment, can determine to transmit the detected vehicle conditions to another electronic control unit in the vehicle, and utilize the detected vehicle conditions as signal values for an interaction protocol data unit.

The electronic control unit can receive signal values from the runtime environment layer and can pack the interaction protocol data unit with the signal values for transmission over the communication bus, for example, implementing the AUTOSAR communication module. The electronic control unit, for example, implementing the AUTOSAR communication module, also can unpack one or more signal values from an interaction protocol data units received from the communication bus and provide the unpacked signal values to the runtime environment layer of the electronic control unit.

These vehicle network communication operations performed by the electronic control unit implementing the AUTOSAR communication module can be resource-intensive and time-consuming. While the "general-purpose" nature of embedded processors in electronic control units can be attractive due to their ability to be reconfigured relatively quickly and implement a wide-array of complex tasks, such as implementing the AUTOSAR standard software architecture, the tradeoffs for this embedded processor flexibility are complexity and inefficiency. The ability to do almost anything comes at the cost of being able to do a few simple things efficiently. As sophistication of automotive electronics increases, a volume of vehicle network traffic between an increasing number of electronic control units can consume a disproportionate amount of the processing resources of those electronic control units, often at the expense of other functionality performed by the electronic control units.

SUMMARY

This application discloses an electronic control unit coupled to a bus in a vehicle communication network. The electronic control unit includes a processing system configured to generate an instruction including an identifier of a type of signal exchanged through a vehicle communication network and including a command associated with exchange of a signal value corresponding to the type of the signal. The electronic control unit includes a communication circuitry configured to identify, based on the type of the signal in the instruction, a packet having a section allocated for the signal value corresponding to the type of the signal. The communication circuitry also can perform packet operations on the section of the packet allocated for the signal value based, at least in part, on the command included in the instruction. The packet operations can include packing the signal value into the packet or extracting the signal value from the packet. Embodiments are described in greater detail below.

DETAILED DESCRIPTION

Electronic Control Unit-Based Vehicle Communication Network

Figure 1:
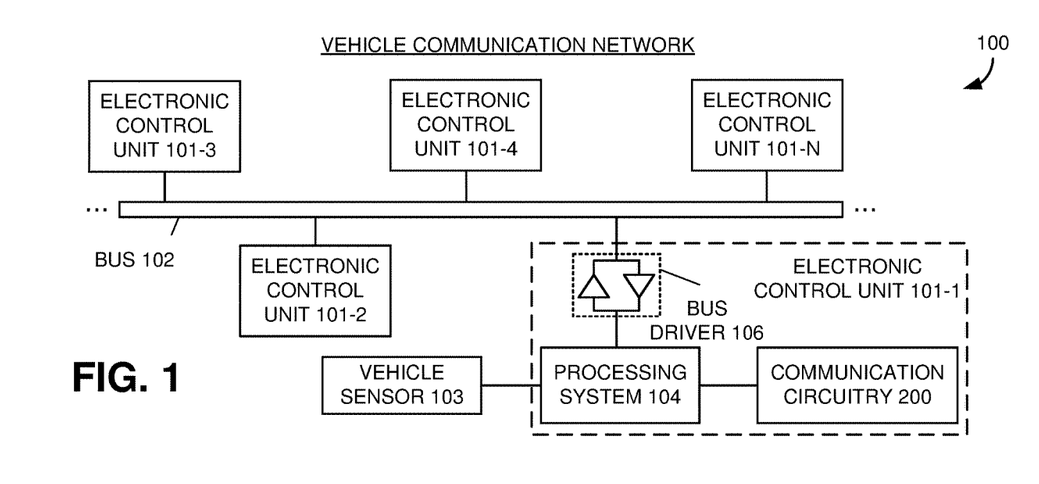
FIG. 1 illustrates an example vehicle communication network including an electronic control unit having separate communication circuitry according to various embodiments.

FIG. 1 illustrates an example vehicle communication network 100 including an electronic control unit 101-1 having separate communication circuitry 200 according to various embodiments. Referring to FIG. 1, the vehicle communication network 100 can include multiple electronic control units (ECUs) 101-1 to 101-N coupled to exchange messages or packets over at least one bus 102 according to at least one network communications protocol, such as a controller area network (CAN) protocol, a local interconnect network (LIN) protocol, a FlexRay protocol, or the like. In some embodiments, the messages or packets exchanged over the bus can be called interaction protocol data units (I-PDUs).

The electronic control units 101-1 to 101-N can generate the messages or packets, for example, including information or signal values based on sensed conditions or activities associated with the vehicle, and transmit the messages or packets to other electronic control units 101-1 to 101-N over the bus 102. The electronic control units 101-1 to 101-N can receive the messages or packets from the bus 102 and parse the messages or packets to extract the information or signal values. In some embodiments, the electronic control units 101-1 to 101-N may prompt presentation or display of the extracted information or signal values, for example, on a user interface. The electronic control units 101-1 to 101-N may analyze or further process the extracted information or signal values to determine whether to initiate a warning signal or aid advanced driver assistance systems, for example, implementing adaptive cruise control, automatic parking, automated braking, blind spot monitoring, collision avoidance, driver drowsiness detection, lane departure warning, or the like.

In some embodiments, the electronic control unit 101-1 can generate packets for transmission over the bus 102, for example, based on input from a vehicle sensor 103. The vehicle sensor 103 can monitor and/or measure conditions or activities corresponding to at least a portion of a vehicle, such as temperature, tire pressure, speed, or the like. The vehicle sensor 103 can generate the input for the electronic control unit 101-1 based on the monitored and/or measured conditions or activities. For example, the vehicle sensor 103 can be a sensor, such as a tire pressure sensor, temperature sensor, or any other type of sensor, which can generate input based on a sensed condition or activity. When the vehicle sensor 103 corresponds to a button, a switch, a multi-state device, or the like, the vehicle sensor 103 can generate input based on a current state or in response to a change of a state.

In some embodiments, one or more of the electronic control units 101-1 to 101-N can implement at least a portion of a standardized AUTOSAR (AUTomotive Open System ARchitecture) layered software architecture. For example, the electronic control unit 101-1 can include a processing system 104, which can implement the standardized AUTOSAR layered software architecture. The AUTOSAR layered software architecture can have multiple layers, such as an application layer, a runtime environment (RTE) layer, and a basic software (BSW) layer. The basic software (BSW) layer also can include multiple layers, such can a services layer, an electronic control unit abstraction layer, a microcontroller abstraction layer, and a complex driver layer. The layers in the basic software (BSW) layer can also be divided into functional groups, for example, the services layer can include a system functional group, a memory functional group, and communication services functional group.

The processing system 104 can control generation of packets for transmission over the bus 102. The electronic control unit 101-1 can include a bus driver 106 to receive the generated packets from the processing system 104 and present the messages to the bus 102 for transmission. The bus driver 106 can receive packets from other electronic control units 101-2 to 101-N over the bus 102, and forward the messages to the processing system 104. The processing system 104 can control a process of extracting information or signal values from the received packets.

The processing system 104 can control generation of the packets and the process of extracting information or signal values from the packets, in part, by generating one or more instructions, which can prompt communication circuitry 200 in the electronic control unit 101-1 to perform at least a portion of the packet generation and signal value extraction for the processing system 104. In some embodiments, the communication circuitry 200 may be implemented as an application-specific instruction set processor, which can utilize the instructions to generate a packet by packing signal values into the packet or extract signal values from a packet by unpacking the signal values from the packet. The communication circuitry 200 also may be implemented as a specially-configured hardware to perform the packing and unpacking operations. Embodiments of the communication circuitry and the instructions will be described below in greater detail.

By including the communication circuitry 200 in the electronic control unit 101-1, the processing system 104 can off-load computationally-expensive operations of packing and unpacking signal values to the communication circuitry 200. Since the communication circuitry 200 can have a hardware architecture with a specific configuration to perform the packing and unpacking operations, those operations can be performed more quickly than by the processing system 104 implemented by at least one general-purpose processing device.

Electronic Control Unit with Dedication Communication Circuitry

Figure 2:
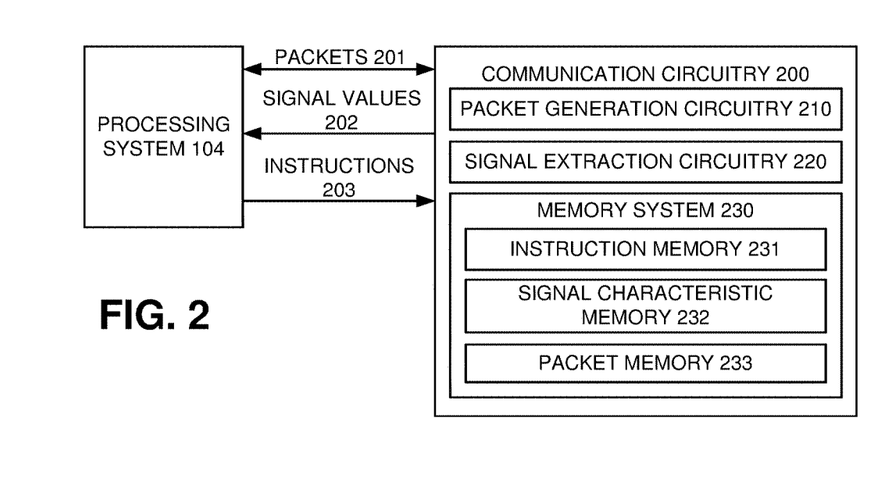
FIG. 2 illustrates an example communication interface in an electronic control unit between a processing system and communication circuitry according to various embodiments.

FIG. 2 illustrates an example communication interface in an electronic control unit between a processing system 104 and communication circuitry 200 according to various embodiments. Referring to FIG. 2, the processing system 104 can generate instructions 203 configured to prompt communication circuitry 200 to perform packet operations, such as generating a packet or extracting signal values from a packet. The instructions 203, in some embodiments, can include a send instruction configured to prompt the communication circuitry 200 to generate a packet packed with a signal value identified by the send instruction. The instructions 203, in some embodiments, can include a receive instruction configured to prompt the communication circuitry 200 to extract a signal value from a packet identified by the receive instruction.

The processing system 104 can receive information, for example, from a vehicle sensor, and determine to transmit the information to an electronic control unit in a vehicle. The processing system 104 can generate the send instruction based on the determination to transmit the information to the electronic control unit, and provide the send instruction to the communication circuitry 200 as one of the instructions 203. In some embodiments, the send instruction can include a signal value corresponding to the received information, an identifier of the signal value type, and a send command. The communication circuitry 200 can utilize the send instruction to generate a packet, such as an interaction protocol data unit, which includes the signal value corresponding to the received information.

In some embodiments, the communication circuitry 200 can store the send instruction received from the processing system 104 in an instruction memory 231 of a memory system 230. The communication circuitry 200 can parse the send instruction stored in the instruction memory 231 and utilize the identifier of the signal value type to identify characteristics of the signal value in the send instruction. For example, the characteristics of the signal value can include a format of the signal value, a bit position the signal value is to be located in the generated packet, a bit-length of the signal value, or the like. The communication circuitry 200 can store the characteristics of the signal value in a signal characteristic memory 232 of the memory system 230. In some embodiments, the signal characteristic memory 232 can be a register or a set of pipelined registers configured to store the characteristics of the signal value.

The communication circuitry 200 also can utilize the identifier of the signal value type to identify a packet identifier. The communication circuitry 200 can utilize the packet identifier to retrieve a packet from a packet memory 233 of the memory system 230. The communication circuitry 200 can include packet generation circuitry 210 to insert or pack the retrieved packet with the signal value in the send instruction based on the send command in the send instruction and the characteristics of the signal value in the signal characteristic memory 232. The packet generation circuitry 210 can output the packet with the inserted signal value to the processing system 104, as one of the packets 201, for subsequent transmission over the bus in the vehicle. In some embodiments, the packet generation circuitry 210 can store the retrieved packet with the inserted signal value back to the packet memory 233.

In some embodiments, the processing system 104 can receive a packet from the bus in the vehicle and determine to extract one or more signal values from the packet. Based on the packet identifier in the packet, the processing system 104 can generate at least one receive instruction, which can be transferred to communication circuitry 200 as one or more of the instructions 203 along with the received packet as one of the packets 201. In some embodiments, the receive instruction can include an identifier of a signal value type to extract from the packet and a receive command.

In some embodiments, the communication circuitry 200 can store the receive instruction received from the processing system 104 in the instruction memory 231 of the memory system 230. The communication circuitry 200 also can store the received packet in the packet memory 233 of the memory system 230. The communication circuitry 200 can parse the receive instruction stored in the instruction memory 231 and utilize the identifier of the signal value type to identify characteristics of the signal value in the receive instruction. For example, the characteristics of the signal value can include a format of the signal value, a bit position the signal value is to be located in the generated packet, a bit-length of the signal value, or the like. The communication circuitry 200 can store the characteristics of the signal value in the signal characteristic memory 232 of the memory system 230.

The communication circuitry 200 also can utilize the identifier of the signal value type to identify a packet identifier. The communication circuitry 200 can utilize the packet identifier to retrieve previously stored packet from a packet memory 233 of the memory system 230. The communication circuitry 200 can include signal extraction circuitry 220 to extract a signal value from the retrieved packet based on the receive command in the receive instruction and the characteristics of the signal value in the signal characteristic memory 232. The signal extraction circuitry 220 can output the extracted signal value as one of the signal values 202 for subsequent utilization by the processing system 104.

Figure 3:
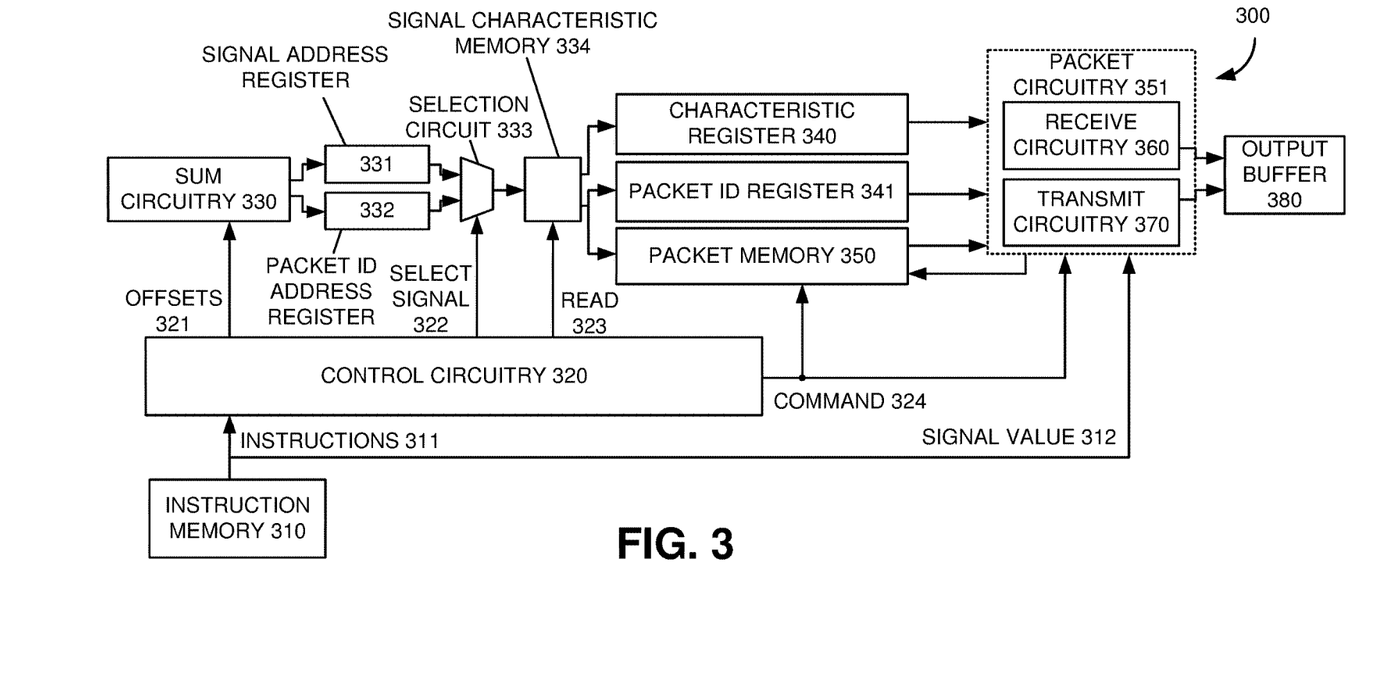
FIG. 3 illustrates an example implementation for communication circuitry in an electronic control unit according to various embodiments.

FIG. 3 illustrates an example implementation for communication circuitry in an electronic control unit according to various embodiments. Referring to FIG. 3, the communication circuitry 300 can include an instruction memory 310 to store one or more instructions 311, such as a send instruction or a receive instruction, for the communication circuitry 300 to utilize to perform operations on at least one packet stored in a packet memory 350. Example formats for the instructions 311 will be described in greater detail below with reference to FIGS. 4A and 4B.

Figure 4A:
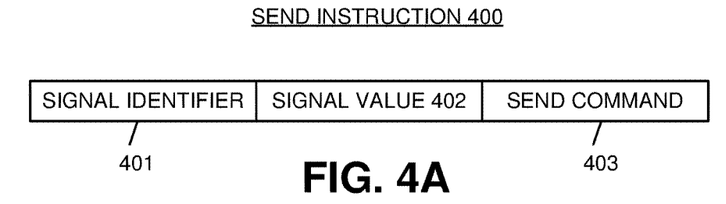
FIGS. 4A and 4B illustrate example instruction formats for the communication circuitry in an electronic control unit according to various embodiments.

FIGS. 4A and 4B illustrate example instruction formats for the communication circuitry in an electronic control unit according to various embodiments. Referring to FIG. 4A, a send instruction 400 can include a signal identifier 401, a signal value 402, and a send command 403. The signal identifier 401 can identify a type of the signal value 402. Since many of communication protocols in vehicle communication network have interaction protocol data units to exchange different types of signals values, the signal identifier 401 can identify the type of the signal value 402 included in the send instruction 400. The send command 403 can identify which packet operation for the communication circuitry to perform, for example, to pack the signal value 402 into an interaction protocol data unit corresponding to the signal value type described by the signal identifier 401.

Figure 4B:
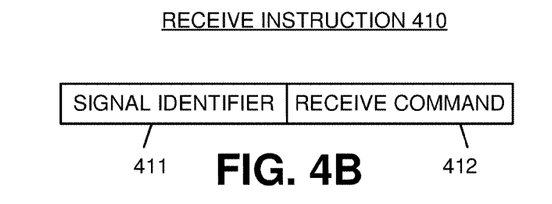

Referring to FIG. 4B, a receive instruction 410 can include a signal identifier 411 and a receive command 412. The signal identifier 411 can identify a type of signal value to extract from an interaction protocol data unit. The receive command 412 can identify which packet operation for the communication circuitry to perform, for example, to unpack a signal value from an interaction protocol data unit corresponding to the signal value type described by the signal identifier 411.

Referring back to FIG. 3, the communication circuitry 300 can perform a fetch operation, which can have the instruction memory 310 output one of its instructions 311, which can prompt performance of the packet operation described in the fetched instruction. The communication circuitry 300 can include control circuitry 320 to receive the fetched instruction and utilized the fetched instruction to prompt or direct an identification of signal value characteristics and an identification of a packet for the communication circuitry 300 to perform the packet operation described in the fetched instruction. The control circuitry 320 also can prompt performance of the packet operation described in the fetched instruction.

In some embodiments, the control circuitry 320 can utilize the signal identifier in the fetched instruction to generate offsets 321, and output the offsets 321 to sum circuitry 330. The sum circuitry 330 can utilize the offsets 321 to generate a signal address and a packet identifier address, for example, by adding the offsets 321 to at least one address value. The sum circuitry 330 can store the signal address in a signal address register 331 and store the packet identifier address in a packet identifier address register 332. In some examples, the control circuitry 320 can provide the offsets 321 to the sum circuitry 330 separately, such as in series, while in other examples, the offsets 321 can be provided to the sum circuitry 300 in parallel.

The communication circuitry 300 can include selection circuitry 333 to receive the signal address from the signal address register 331 and the packet identifier address from the packet identifier address register 332, and selectively output one of the addresses based on a select signal 322 from the control circuitry 320. In some embodiments, the control circuitry 320 can generate the select signal 322 based on an order that the offsets 321 were provided to the sum circuitry 330, and with a timing that takes into consideration the operations performed by the sum circuitry 330, storage of the addresses in the registers 331 and 332, and propagation of those stored addresses to the selection circuitry 333.

The communication circuitry 300 can include a signal characteristic memory 334 to output stored information based on the address output from the selection circuitry 333 and a read command 323 from the control circuitry 320. For example, when the selection circuitry 333 outputs a signal address, information stored at the signal address in the signal characteristic memory 334 can be output to a signal characteristic register 340. In some embodiments, the information stored at the signal address can correspond to characteristics of a signal value, which can include a location of the signal value within a packet, a length of the signal value, a format of the signal value, or the like. In another example, when the selection circuitry 333 outputs a packet identifier address, information stored at the packet identifier address in the signal characteristic memory 334 can be output to a packet identifier register 341 and a packet memory 350. In some embodiments, the information stored at the packet identifier address can correspond to an identifier of a packet stored in the packet memory 350.

The control circuitry 320 can output a command 324 corresponding to a send command or a receive command included in the fetched instruction, which can be received by the packet memory 350 and packet circuitry 351. The packet memory 350, in response to the command 324, can output a packet corresponding to the identifier read from the signal characteristic memory 334. The packet circuitry 351 can receive the packet from the packet memory 350.

The packet circuitry 351 can implement packet operations, such as signal value extraction operations or signal value transmission operations, based on the command 324. The signal value extraction operations can unpack the signal value from the packet, while the signal value transmission operations can pack the signal value into the packet. The packet circuitry 351 can include circuitry to implement both types of operations. In some embodiments, the same circuitry can be utilized to perform both operations. In other embodiments, the packet circuitry 351 can include receive circuitry 360 to perform the signal value extraction operations, and include transmit circuitry 370 to perform the signal value transmission operations.

The receive circuitry 360 can perform unpacking operations on the packet received from the packet memory 350 when the command 324 corresponds to a receive command. The receive circuitry 360 also can receive the characteristics of the signal value from the characteristic register 340. The receive circuitry 360 can extract the signal value from the packet received from the packet memory 350 based on the received characteristics of the signal value. In some embodiments, the receive circuitry 360 can utilize the location of the signal value in the packet to extract a preset portion of the packet, and then utilize the signal value length characteristic to unpack the signal value from the preset portion of the packet. The receive circuitry 360 can store the unpacked or extracted signal value in an output buffer 380, which can deliver the unpacked or extracted signal value to the processing system in the electronic control unit.

The transmit circuitry 370 can perform packing operations on the packet received from the packet memory 350 when the command 324 corresponds to a send command. The transmit circuitry 370 also can receive the characteristics of the signal value from the characteristic register 340, the packet identifier from the packet identifier register 341, and a signal value 312 to insert into the packet from the packet memory 350. The signal value 312 can be provided directly from the instruction memory 310 or from the control circuitry 320.

The transmit circuitry 370 can insert the signal value 312 into the packet received from the packet memory 350 based on the received characteristics of the signal value. In some embodiments, the transmit circuitry 370 can utilize the location of the signal value in the packet to extract a preset portion of the packet, utilize the signal value length characteristic to pack the signal value 312 into the preset portion of the packet, and insert the preset portion packed with the signal value 312 back into the packet. The transmit circuitry 370 can store the packet including the signal value 312 in output buffer 380, which can deliver the packet to the processing system in the electronic control unit. The transmit circuitry 370 also can utilize the packet identifier to store the packet packed with the signal value 312 back to the packet memory 350, for example, for subsequent transmission or for additional packing of signal values.

Figure 5:
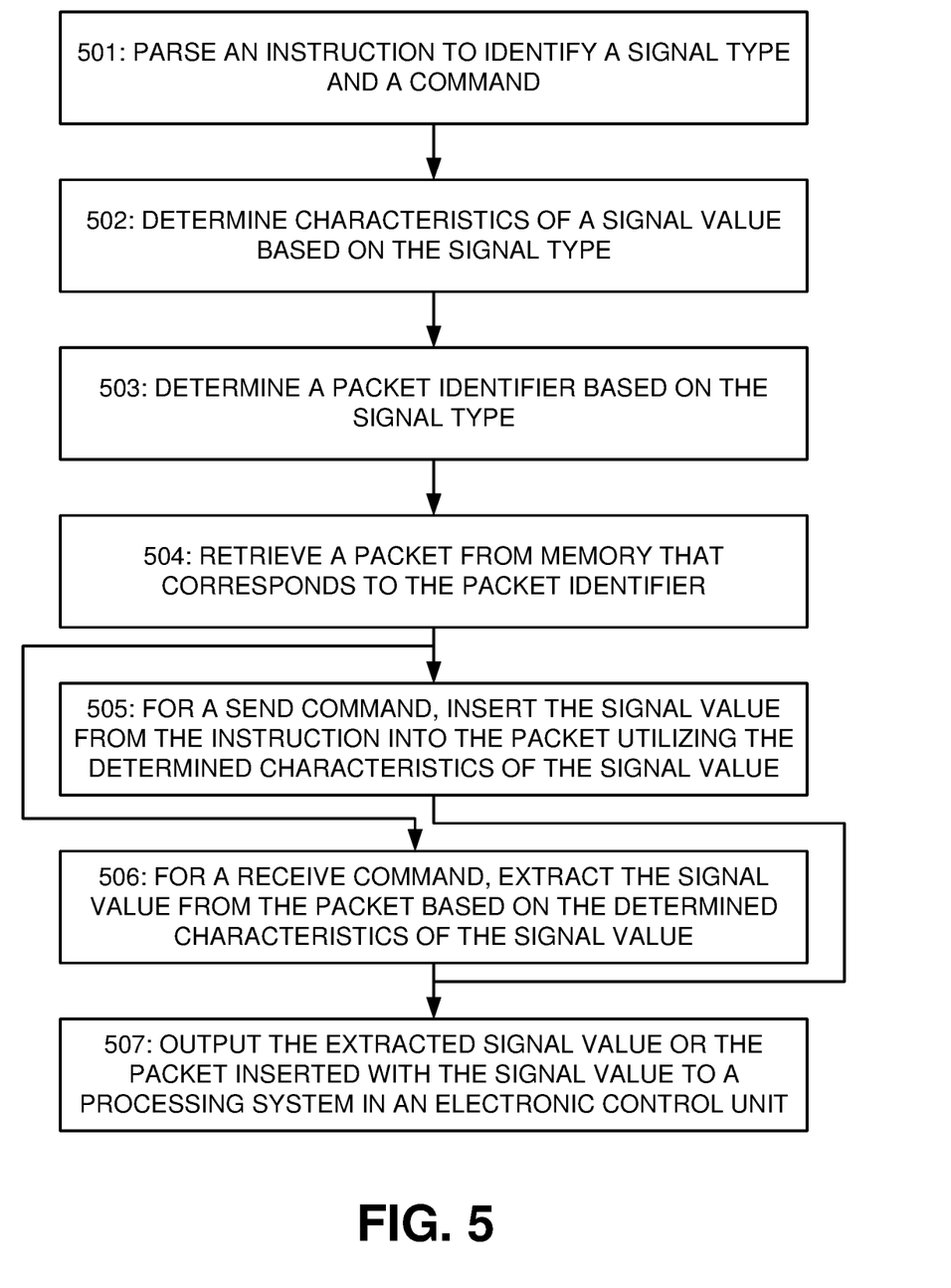
FIG. 5 illustrates a flowchart showing an example packet operations performed by communication circuitry in an electronic control unit according to various examples.

FIG. 5 illustrates a flowchart showing an example packet operations performed by communication circuitry in an electronic control unit according to various examples. Referring to FIG. 5, in a block 501, the communication circuitry can parse an instruction to identify a signal type and a command. The communication circuitry can include an instruction memory to store one or more instructions, such as a send instruction or a receive instruction. In some embodiments, the send instructions can include a signal type, a signal value, and a send command, while the receive instructions can include a signal type and a receive command. The communication circuitry can parse the send or receive instructions to identify the signal type and the send or receive command, respectively.

In a block 502, the communication circuitry can determine characteristics of a signal value based on the signal type. In some embodiments, the communication circuitry can include a signal characteristic memory storing characteristics of different signal values. The communication circuitry can utilize the signal type to generate an address for the signal characteristic memory that corresponds to the characteristics of the signal value. The characteristics of the signal value can include a signal length, a location of the signal value in a packet, a format of the signal value, or the like.

In a block 503, the communication circuitry can determine a packet identifier based on the signal type. In some embodiments, the signal characteristic memory can store packet identifiers for a multiple different packets stored in a packet memory. The communication circuitry can utilize the signal type to generate an address for the signal characteristic memory that corresponds to a packet identifier for a packet configured to include the signal value.

In a block 504, the communication circuitry can retrieve a packet from memory that corresponds to the packet identifier. The communication circuitry may utilize the packet identifier to read the packet from the packet memory.

In a block 505, the communication circuitry, for a send command, can insert the signal value from the instruction into the packet utilizing the determined characteristics of the signal value. In some embodiments, the communication circuitry can extract a preset portion of the packet corresponding to the location of the signal value in the packet, pack the signal value into the preset portion based on the signal length of the signal value, and insert the packed preset portion back into the packet.

In a block 506, the communication circuitry, for a receive command, can extract the signal value from the packet based on the determined characteristics of the signal value. In some embodiments, the communication circuitry can extract a preset portion of the packet corresponding to the location of the signal value in the packet and unpack the signal value from the preset portion based on the signal length of the signal value.

In a block 507, the communication circuitry can output the extracted signal value or the packet inserted with the signal value to a processing system in an electronic control unit. For example, the communication circuitry may include an output buffer to store the extracted signal value or the packet inserted with the signal value, the contents of which can be delivered to the processing system in the electronic control unit.

Figure 6:
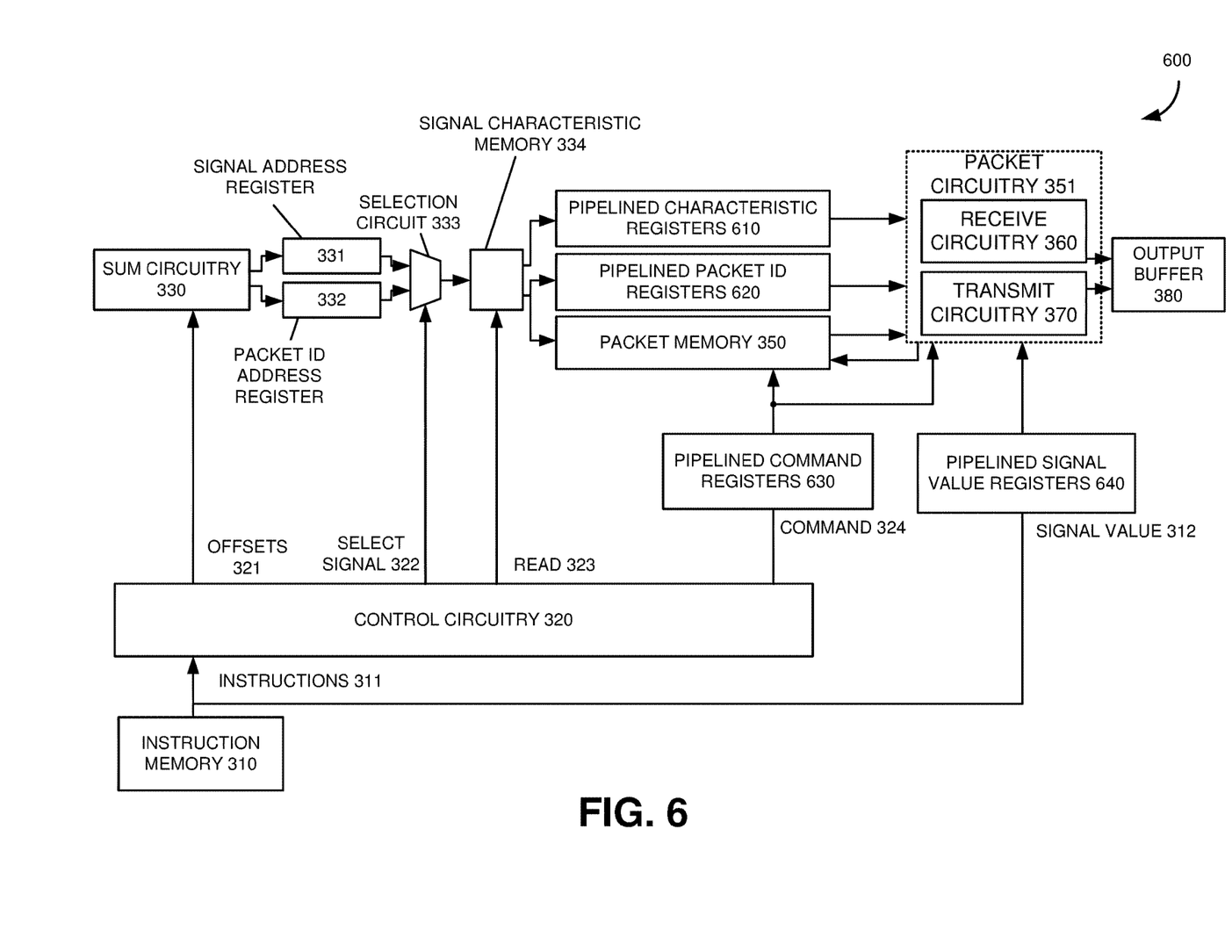
FIG. 6 illustrates an example pipelined implementation for communication circuitry in an electronic control unit according to various embodiments.

FIG. 6 illustrates an example pipelined implementation for communication circuitry 600 in an electronic control unit according to various embodiments. Referring to FIG. 6, the pipelined implementation for the communication circuitry 600 in FIG. 6 can have a similar hardware configuration as the communications circuitry 300 described above with referenced in FIG. 3 with the following differences. The communication circuitry 300 was described above as performing packet operations for one instruction at a time. The communication circuitry 600 can include multiple different sets of pipeline registers that can allow the communication circuitry 600 to concurrently perform packet operations for multiple instructions.

The communication circuitry 600 can include pipelined registers, such as pipelined characteristic registers 610, pipelined packet identifier registers 620, pipelined command registers 630, and pipelined signal value registers 640. Each of these pipelined registers may include multiple registers that can transfer a stored value to an adjacent register during each clock cycle of the electronic control unit. The number of registers included in each set of the pipelined registers can be based on a delay between when an instruction 311 was fetched from the instruction memory 310 and when the data in the pipeline registers will be subsequently utilized to perform packing and unpacking operations. For example, the signal value 312 and the command 324 in the instruction 311 may have their presentation to the transmit circuitry 370 delayed until the rest of the communication circuitry 600 has had an opportunity to identify characteristics of the signal value 312 and identify a packet to pack with the signal value 312. The pipelined command registers 630 and the pipelined signal value registers 640 can delay the presentation of the command 324 and the signal value 312, respectively, for a number of clock cycles determine based on a number of registers in their pipelines.

The pipelined characteristic registers 610 and the pipelined packet identifier registers 620 can delay the presentation of the characteristics of the signal value 312 and the packet identifier to the receive circuitry 360 and/or the transmit circuitry 370, for example, until the receive circuitry 360 and/or the transmit circuitry 370 have also received the packet from the packet memory 350, the command 324 from the pipelined command registers 630, and/or the signal value 312 from the pipelined signal value registers 640.

Figure 7:
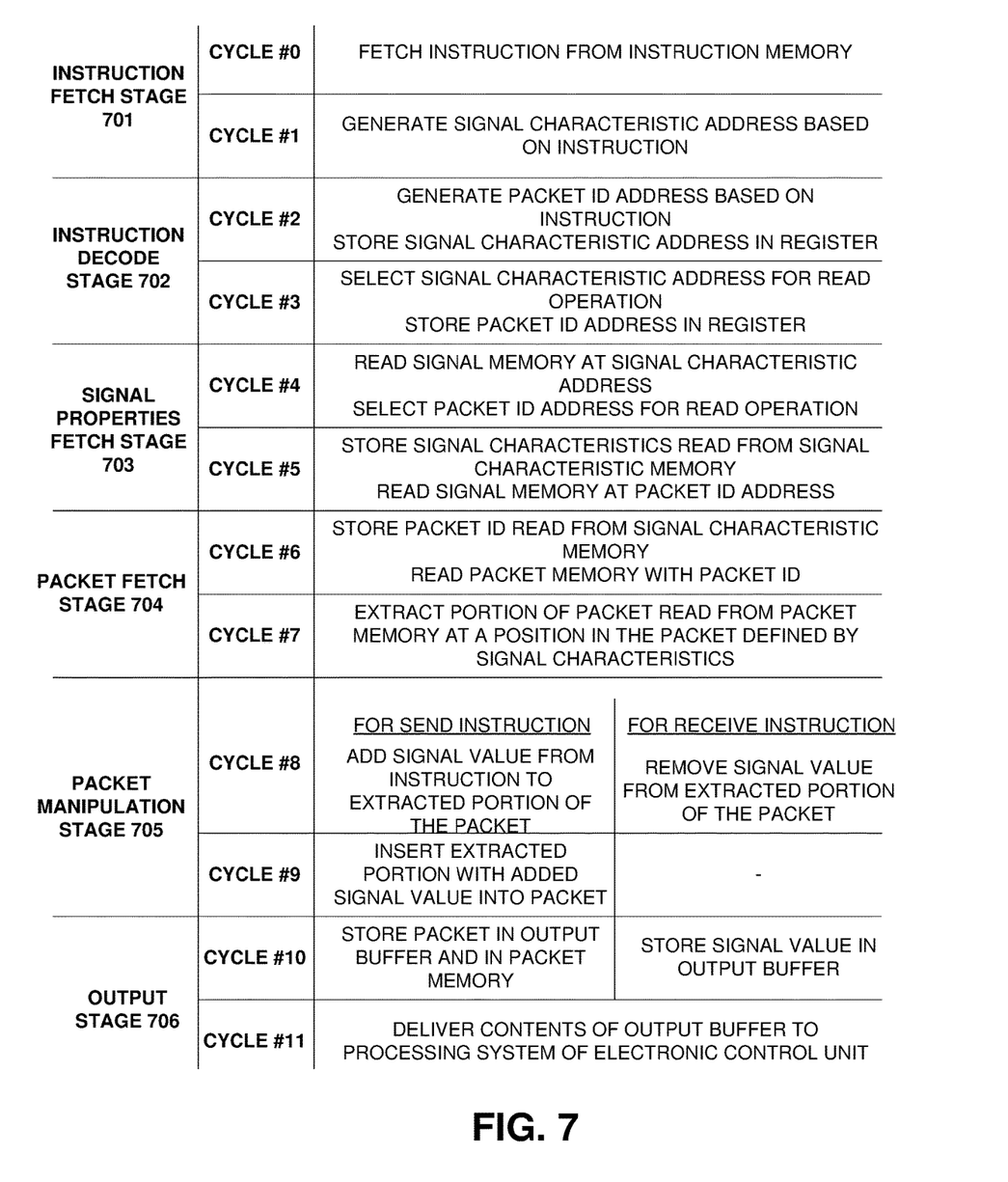
FIG. 7 illustrates an example sequence of operations performed by communication circuitry in an electronic control unit in a pipelined implementation according to various examples.

FIG. 7 illustrates an example sequence of operations performed by communication circuitry in an electronic control unit in a pipelined implementation according to various examples. Referring to FIG. 7, the communication circuitry can operate in multiple different stages, such as an instruction fetch stage 701, an instruction decode stage 702, a signal properties fetch stage 703, a packet fetch stage 704, a packet manipulation stage 705, and an output stage 706. Each of these stages 701-706 can be performed sequentially or, in some cases, at least partially in parallel.

In some embodiments, the instruction fetch stage 701 can include operations performed in a pair of clock cycles. For example, in a clock cycle #0 for an electronic control unit, the communication circuitry can fetch an instruction from an instruction memory. This operation by the communication circuitry can include generation of an offset by the control unit from the signal value type in the fetched instruction. A command and possibly a signal value in the fetched instruction can be stored in pipelined registers for utilization by the communication circuitry starting in clock cycle #8.

In a clock cycle #1 for the electronic control unit, the communication circuitry can generate a signal characteristic address based on the instruction. For example, the sum unit can receive the offset and generate the signal characteristic address based on the offset. The communication circuitry also can generate another offset, for example, corresponding to a packet identifier address during this clock cycle.

In some embodiments, the instruction decode stage 702 can include operations performed in a pair of clock cycles. For example, in a clock cycle #2 for the electronic control unit, the communication circuitry can generate a packet identifier address based on the instruction and store the signal characteristic address in a register. For example, the sum unit can receive the offset and generate the packet identifier address based on the other offset. The communication circuitry may be able to fetch a different instruction from the instruction memory during the clock cycle, which would allow for subsequent generation of the signal characteristic address and the packet identifier address for the different instruction over the following clock cycles. The pipelined implementation of the communication circuitry can allow for overlap of instruction-driven operations rather than having to wait to start operations corresponding to a next instruction until after the commands have been completed and the results stored in the output buffer.

In a clock cycle #3 for the electronic control unit, the communication circuitry can select the signal characteristic address for a read operation and store the packet identifier address in a register. The selection of the signal characteristic address can allow the signal characteristic address to pass from the register to a signal characteristic memory.

In some embodiments, the signal properties fetch stage 703 can include operations performed in a pair of clock cycles. For example, in a clock cycle #4 for the electronic control unit, the communication circuitry can read a signal characteristic memory at the signal characteristic address and select packet identifier address for a read operation. The selection of the packet identifier address can allow the packet identifier address to pass from the register to a signal characteristic memory.

In a clock cycle #5 for the electronic control unit, the communication circuitry can store the signal characteristics read from the signal characteristic memory and read the signal characteristic memory at the packet identifier address.

The signal characteristics read from the signal characteristic memory may be stored in a pipelined register, which can delay the utilization of the signal characteristics by the communication circuitry until clock cycles #7, #8, and #9.

In some embodiments, the packet fetch stage 704 can include operations performed in a pair of clock cycles. For example, in a clock cycle #6 for the electronic control unit, the communication circuitry can store the packet identifier read from the signal characteristic memory and read a packet from a packet memory with the packet identifier. The packet identifier read from the signal characteristic memory may be stored in a pipelined register, which can delay the utilization of the packet identifier by the communication circuitry until clock cycle #9.

In a clock cycle #7 for the electronic control unit, the communication circuitry can extract a portion of the packet read from the packet memory at a position in the packet defined by the signal characteristics stored in the pipeline register.

In some embodiments, the packet manipulation stage 705 can include operations performed in a pair of clock cycles. For example, in a clock cycle #8 for the electronic control unit, the communication circuitry, for a send instruction, can add a signal value originally from the instruction—and previously stored in a pipelined register—to the extracted portion of the packet. The addition of the signal value to the packet can be based on a signal length defined by the signal characteristics stored in the pipeline register.

In the clock cycle #8 for the electronic control unit, the communication circuitry, for a receive instruction, can remove a signal value from the extracted portion of the packet. The extraction of the signal value from the packet can be based on a signal length defined by the signal characteristics stored in the pipeline register.

In a clock cycle #9 for an electronic control unit, the communication circuitry, for the send instruction, can insert the extracted portion with the added signal value into the packet at a position in the packet defined by the signal characteristics stored in the pipeline register. In the clock cycle #9 for the electronic control unit, the communication circuitry, for the receive instruction, can idle its operation.

In some embodiments, the output stage 706 can include operations performed in a pair of clock cycles. For example, in a clock cycle #10 for the electronic control unit, the communication circuitry, for the send instruction, can store the packet with the signal value in an output buffer and in the packet memory. In a clock cycle #10 for the electronic control unit, the communication circuitry, for the receive instruction, can store the extracted signal value in the output buffer.

In a clock cycle #11 for the electronic control unit, the communication circuitry can deliver contents of the output buffer to a processing system of the electronic control unit.

The process of the communication circuitry, in this example embodiment, can be 12 clock cycles. The ability to overlap the operations prompted by different instructions in the instruction memory based on the hardware configuration of the communication circuitry and the utilization of the pipeline registers can reduce throughput for the communication circuitry. Although the stages 701-706 are shown in example embodiments being performed in multiple sequential clock cycles, in some embodiments, the stages 701-706 can be performed in a different number of clock cycles, in a different order, and/or at least partially in parallel with each other.

Portions of system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to certain processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   parsing, by communication circuitry, an instruction including an identifier of a type of signal exchanged through a vehicle communication network and including a command associated with exchange of a signal value corresponding to the type of the signal;
   identifying, based on the type of the signal from the instruction, a packet having a section allocated for the signal value corresponding to the type of the signal;
   identifying, based on the type of the signal from the instruction, signal characteristics for the signal value including at least one of a position of the signal value in the packet or a size of the signal value; and
   performing, by communication circuitry, packet operations on the section of the packet allocated for the signal value based, at least in part, on the command included in the instruction and the signal characteristics for the signal value.

2. The method of claim 1, wherein the performing the packaging operations further comprising extracting the signal value from the allocated section of the packet, wherein the method further comprises outputting, by communication circuitry, the extracted signal value to a processing system of an electronic control unit in the vehicle communication network.

3. The method of claim 1, wherein the performing the packaging operations further comprising inserting the signal value into the allocated section of the packet, wherein the method further comprises outputting, by communication circuitry, the packet to a processing system of an electronic control unit in the vehicle communication network.

4. The method of claim 3, wherein the instruction is configured to include the signal value for the communication circuitry to insert into the allocated section of the packet.

5. The method of claim 1, wherein the packet is an interaction protocol data unit (I-PDU) formatted according to an automotive open system architecture (AUTOSAR) standard.

6. A system comprising:
   a processing system configured to generate an instruction including an identifier of a type of signal exchanged through a vehicle communication network and including a command associated with exchange of a signal value corresponding to the type of the signal; and
   communication circuitry configured to identify, based on the type of the signal in the instruction, a packet having a section allocated for the signal value corresponding to the type of the signal and signal characteristics for the signal value including at least one of a position of the signal value in the packet or a size of the signal value, and to perform packet operations on the section of the packet allocated for the signal value based, at least in part, on the command included in the instruction and the signal characteristics for the signal value.

7. The system of claim 6, wherein the processing system is configured to receive the packet over a bus in a vehicle communication network and provide the packet to the communication circuitry, and wherein the communication circuitry is configured to extract the signal value from the allocated section of the packet based on the instruction from the processing system.

8. The system of claim 7, wherein the communication circuitry is configured to provide the extracted signal value to the processing system.

9. The system of claim 8, wherein the communication circuitry is configured to perform the packet operations by inserting the signal value into the allocated section of the packet, and to output the packet to the processing system.

10. The system of claim 9, wherein the instruction is configured to include the signal value for the communication circuitry to insert into the allocated section of the packet.

11. The system of claim 6, wherein the communication circuitry includes pipelined registers, which allows the communication circuitry to perform packet operations for multiple instructions concurrently.

12. A device comprising:
    control circuitry configured to parse an instruction including an identifier of a type of signal exchanged through a vehicle communication network and including a command associated with exchange of a signal value corresponding to the type of the signal;
    packet circuitry configured to identify a section of a packet allocated for a signal value based on the type of the signal from the instruction, and perform packet operations on the section of the packet allocated for the signal value based, at least in part, on the command included in the instruction; and
    a signal characteristic memory configured to output signal characteristics for the signal value including at least one of a position of the signal value in the packet or a size of the signal value, wherein the packet circuitry is configured to utilize the signal characteristics for the signal value to perform the command identified by the instruction on the section of the packet allocated for inclusion of the signal value.

13. The apparatus of claim 12, wherein the packet circuitry is configured by the command to extract the signal value from the allocated section of the packet.

14. The apparatus of claim 13, further comprising an output buffer configured to deliver the extracted signal value to a processing system of an electronic control unit in the vehicle communication network.

15. The apparatus of claim 12, wherein the packet circuitry is configured by the command to insert the signal value into the allocated section of the packet.

16. The apparatus of claim 15, further comprising an output buffer configured to deliver the packet with the inserted signal value to a processing system of an electronic control unit in the vehicle communication network.

17. The apparatus of claim 15, wherein the instruction is configured to include the signal value for the packet circuitry to insert into the allocated section of the packet.

\* \* \* \* \*